(12) United States Patent
Totsuka et al.

(10) Patent No.: US 6,262,763 B1
(45) Date of Patent: Jul. 17, 2001

(54) ACTUAL SIZE IMAGE DISPLAY

(75) Inventors: Keiichi Totsuka, Edgewater; Tadamasa Kitsukawa, Wyckoff, both of NJ (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/346,232

(22) Filed: Jul. 1, 1999

(51) Int. Cl.[7] ................................................ H04N 5/225
(52) U.S. Cl. ............................................ 348/135; 348/136
(58) Field of Search ................................. 348/17, 25, 135, 348/136, 137, 140, 358; 345/439, 127–128, 129, 333, 131–132; 382/298, 312; 358/451

(56) References Cited

U.S. PATENT DOCUMENTS

| | | | |
|---|---|---|---|
| 4,396,944 | * | 8/1983 | McKenney et al. .................... 348/81 |
| 4,980,763 | * | 12/1990 | Lia ....................................... 348/137 |
| 5,331,419 | * | 7/1994 | Yamada et al. ...................... 348/137 |
| 5,937,213 | * | 8/1999 | Wakabayashi et al. ................ 396/50 |

* cited by examiner

Primary Examiner—Wendy R. Garber
Assistant Examiner—Mitchell White
(74) Attorney, Agent, or Firm—Larry Liberchuk; Chris Tobin

(57) ABSTRACT

A video camera captures image data and determines parameters indicative of a size of an image. Such data may, for example, be recorded on a recording medium or may be broadcasted. A video apparatus reproduces the recorded data from the recording medium or may receive the broadcasted data. Information indicative of a size of a display screen of a display unit is provided to the video apparatus, which then produces an actual size signal representative of an actual size of a desired object of the image in accordance with the screen size information and the image size data and may supply the same to the display unit so as to enable the desired object of the image or a portion thereof to be displayed on the display screen in actual size.

25 Claims, 6 Drawing Sheets

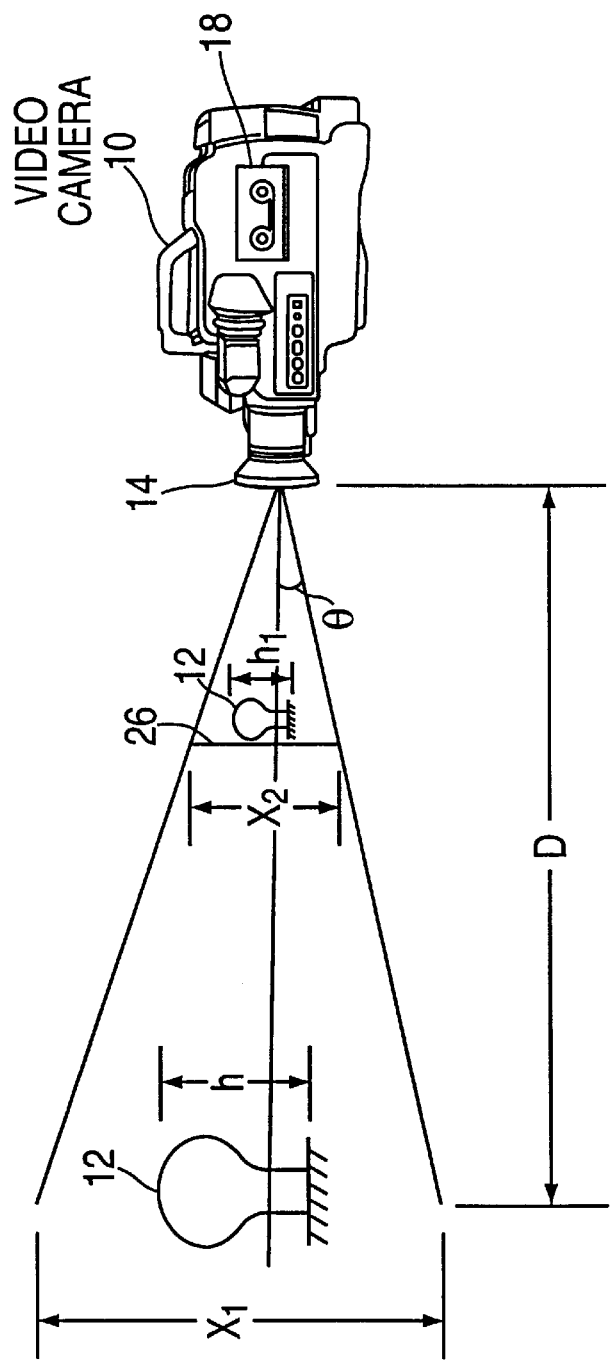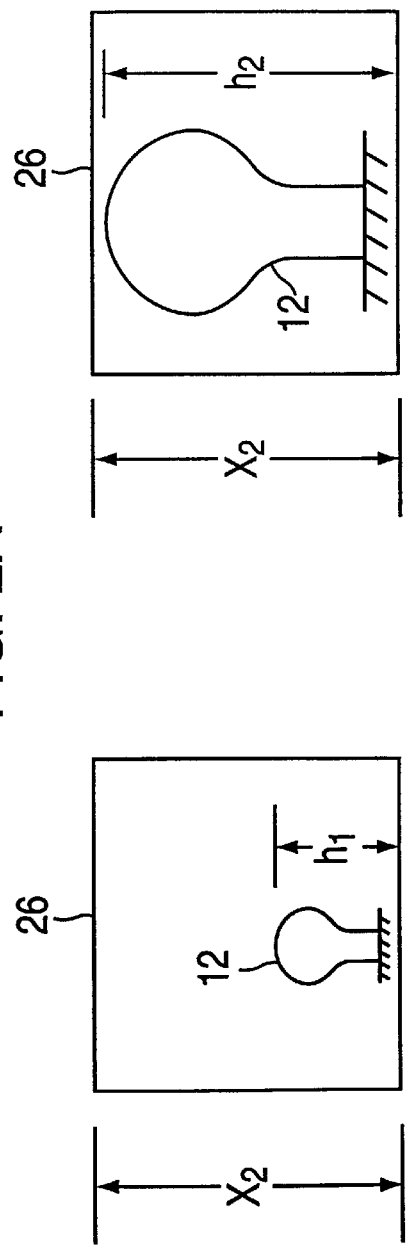
FIG. 2A
FIG. 2B
FIG. 2C

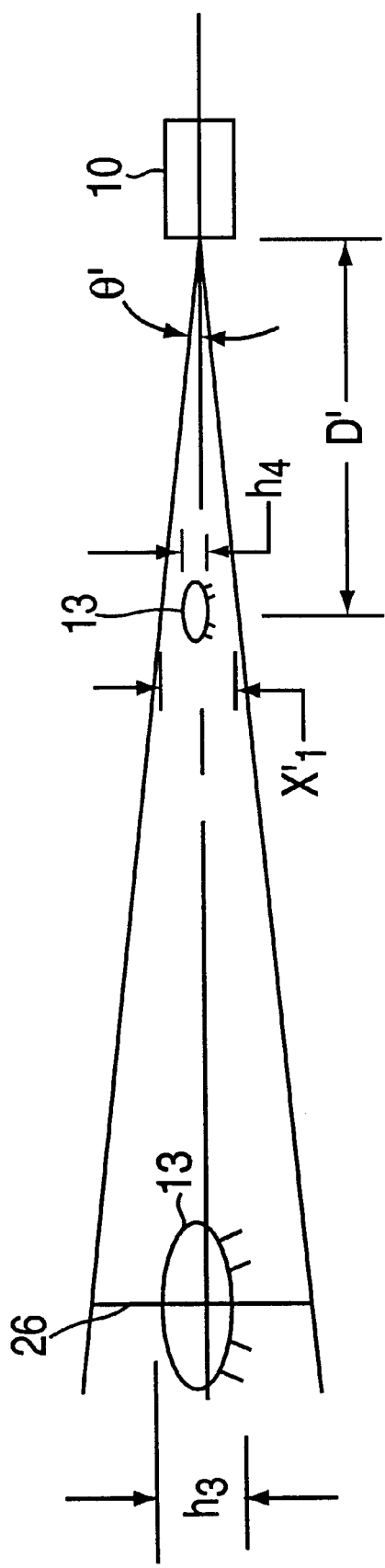
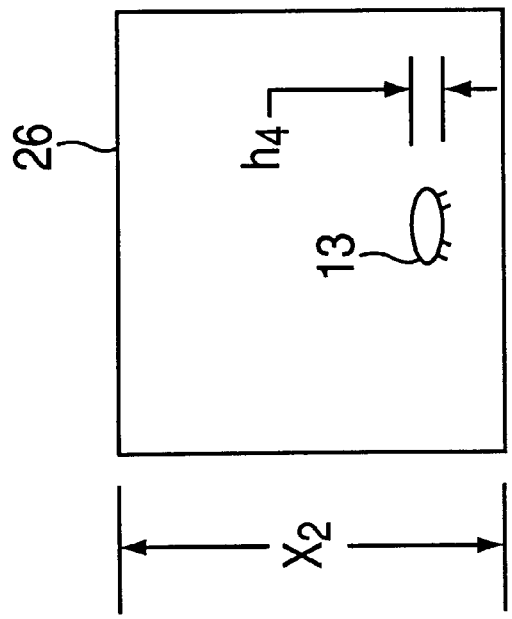
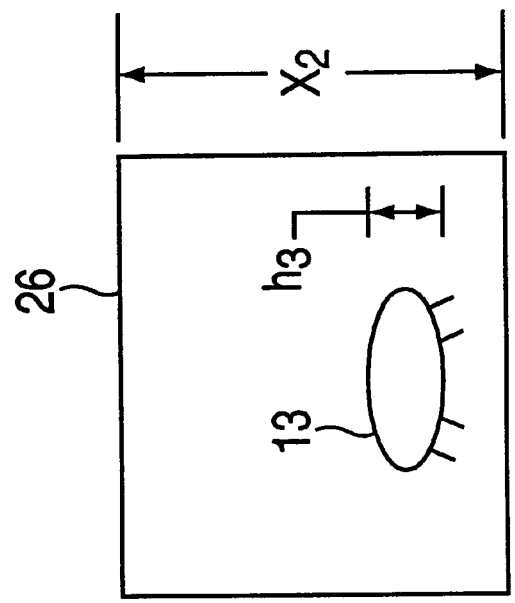
FIG. 2D
FIG. 2F
FIG. 2E

ACTUAL SIZE IMAGE DISPLAY

BACKGROUND OF THE INVENTION

1. Field of the Invention

The present invention relates generally to imaging techniques, and more particularly to displaying images in actual size.

2. Background of the Related Art

Images of people, animals, objects and so forth may be displayed on a display screen (such as a television screen, a movie screen, a computer monitor and the like) are in sizes which may be either smaller than or larger than their actual size. For example, a relatively large or small person, animal or object (such as a tall basketball player, an elephant, an ant, an integrated circuit (IC) chip and so forth) may appear on such screen or monitor to be larger or smaller than the actual size thereof. This reduction or enlargement may be done in order to let viewers see the details of those images if they are small, or to fit those images in their entirety on the screen if the sizes of the images exceed the screen dimensions. However, a person viewing a particular image on a television screen, a computer monitor or the like may be unaware of the actual size of the viewed image.

In the above-described situations, since the image on the screen may not be indicative of the size or dimensions of the person, animal, or object, the viewer may not be able to determine the actual size thereof unless the viewer has prior knowledge pertaining to such actual size. Some the actual size thereof unless the viewer has prior knowledge pertaining to such actual size. Some viewers, such as certain adult viewers, may have such prior knowledge and may use it when viewing the displayed images. In other words, these adults may draw from their mental "databases" which may have numerous facts, statistics and real life experiences; and subconsciously they may perceive people, animals, objects and so forth in their actual size when looking at them on the screen of a movie theater, projection television, and so forth. As a result, such adults viewing a 7'1" basketball player on such screen may realize that the basketball player is quite tall in comparison with other people, and may approximately envision the size of that basketball player. However, other viewers such as young children may not have vast "databases" of knowledge, and may be confused as to the actual size of a displayed image. For example, a child viewing an ant on a displayed screen whose displayed size is several times its actual size may be confused as to the ant's actual size.

Accordingly, it may be desirable to have a video system wherein a viewer may be able to view an image of a desired person, animal, object and so forth on a display screen in its actual size.

SUMMARY OF THE INVENTION

The present invention provides methods, systems and apparatus which enable the display of an image such as a person, animal, object and so forth in actual size on a display screen of a display unit.

In certain embodiments, an actual size signal representative of the actual size of the image is determined in accordance with a ratio that defines the size of the image relative to the size of the display screen. A display unit supplies information pertaining to the size of its display screen, such that the image can then be displayed in actual size on the display screen. This might be accomplished by activating a predetermined function key on a remote control device used with the video system.

In accordance with an aspect of the present invention, a video apparatus is provided which comprises a device for receiving a number of fields or frames of image data, screen size information indicative of a size of a display screen of a display unit, and image size information indicative of a size of a number of images; and a device for producing an actual size signal representative of an actual size of a desired person, animal, object and so forth of a respective field or frame in accordance with the screen size and image size information; wherein the actual size signal is adaptable for supply to the display unit so as to enable an image of the desired person, animal object and so forth to be displayed thereon in actual size.

In accordance with another aspect of the present invention, a video system is provided which comprises a video camera for recording image data on a recording medium, for determining image size information indicative of a size of an image, and for recording the image size information on the recording medium; a display unit having a display screen; and a reproducing device having a device for reproducing the recorded image data and image size information from the recording medium, a device for receiving screen size information indicative of a size of the display screen, and a device for producing an actual size signal representative of an actual size of a desired object of the image in accordance with the screen size and image size information and for supplying the actual size signal to the display unit so as to enable the desired object of the image or a portion thereof to be displayed on the display screen in actual size.

BRIEF DESCRIPTION OF THE DRAWINGS

These and other features and advantages that are realized according to the present invention will be apparent from the following detailed description when read in conjunction with the accompanying drawings, in which:

FIGS. 2A–2F are diagrams to which reference will be made in explaining operations of the video system of FIG. 1;

DETAILED DESCRIPTION

Figure 1:
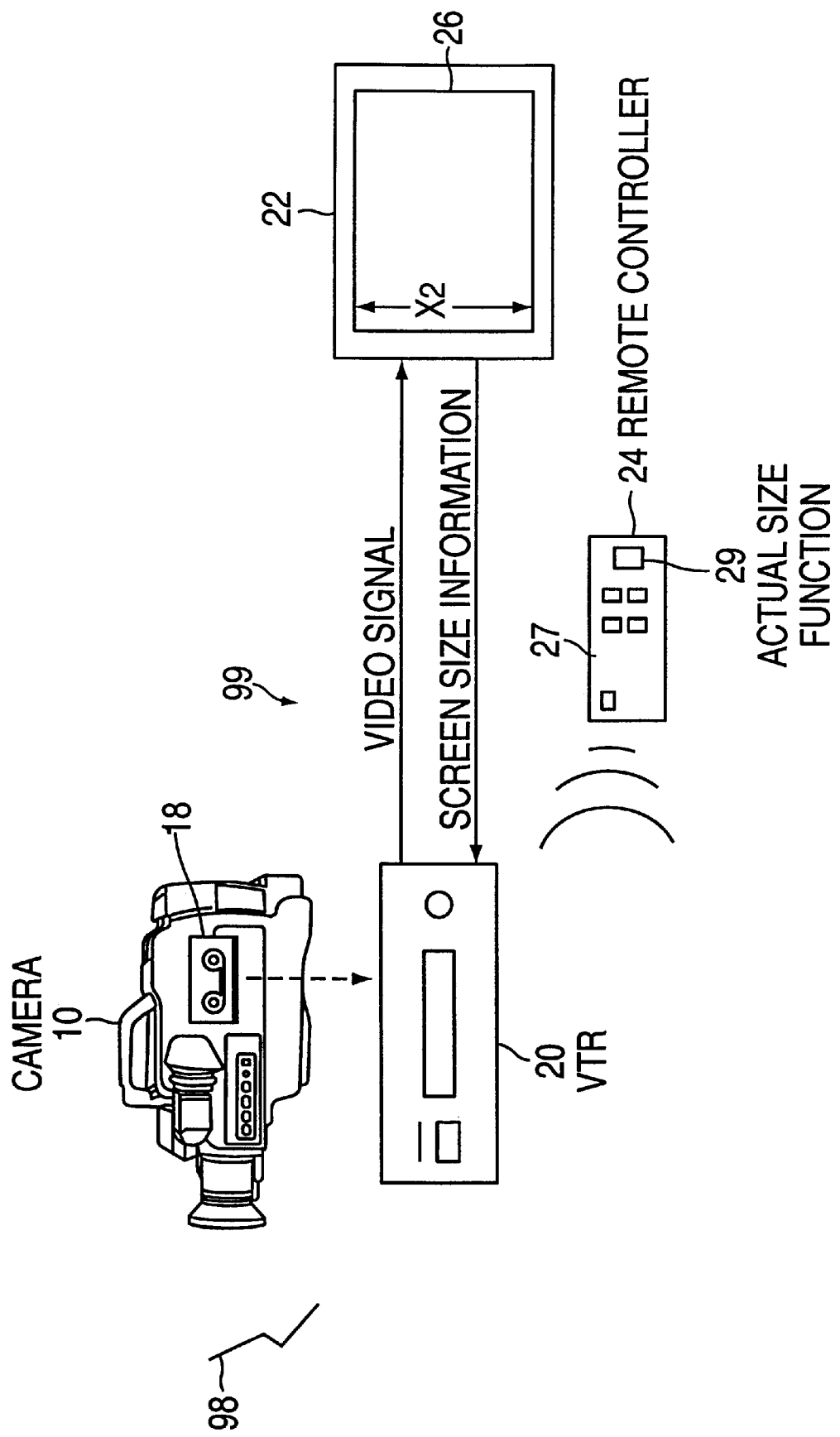
FIG. 1 is a diagram of a video system according to an embodiment of the present invention.

FIG. 1 illustrates a video system 99 according to an embodiment of the present invention. As shown therein, the system includes a video camera 10, a video tape recorder/reproducer (VTR) 20, and a television unit 22. The video camera 10 may be adapted to capture an image of a particular scene and to record it on a recording medium such as a cassette tape 18. Additionally, the video camera 10 determines information pertaining to the size of the particular scene, or an image within the scene, and records the size information on the tape 18. For example, the size information may be the height of a scene X, including the subject image (see FIG. 2A). This height may also be referred to as the actual height of the frame corresponding to the captured image.

Still referring to FIG. 1, the VTR 20 is coupled to the television unit 22 and is adapted to receive a recording medium such as the cassette tape 18 having the image and size information recorded thereon. It is also configured to reproduce the recorded image and size information. The VTR 20 may be operable in a normal reproduction mode and an actual size reproduction mode. In the normal reproduction mode (the reproduction mode is one type of display mode), the VTR reproduces data (such as video data) from the tape 18 and supplies the reproduced video data to the television unit 22, whereupon the image corresponding thereto is displayed. In the actual size reproduction (display) mode, the VTR 20 receives information pertaining to the size of the screen 26 of the television unit 22 and uses this screen size information along with the image size information to produce actual size video signals which are supplied to the television unit 22, whereupon the image is displayed in its actual size.

As shown in FIG. 1, for example, the television unit 22 has a display screen 26 with a dimension (which may be referred to as height) denoted $X_2$. As described above, upon command the television unit 22 displays images in actual size, based upon actual size image signals received from the VTR 22. The television unit 22 is preferably arranged to convey screen size information (such as the dimension $X_2$) to the VTR 20, so that the VTR 20 can provide accurate actual size video signals to the unit 22. Such screen size information may be automatically supplied to the VTR 20 in response to a request signal from the VTR 20 or may be supplied to the VTR 20 when it is initially connected to the television unit 22.

The VTR 20 and/or the television unit 22 may be controlled by a remote control device 24 having cursor directional keys 27 and a key 29 which, when depressed or activated, causes the actual size reproduction mode to be activated. As such, a viewer may select a desired object by use of the cursor directional keys 27 and may activate the actual size mode by depressing the key 29 during a particular image or sequence of images, whereupon the actual size of the desired object may be displayed in actual size on the screen 26, as hereinafter more fully described.

Operations of the video system 99 involving the normal reproduction mode and the actual size reproduction mode will now be described with reference to an example illustrated in FIGS. 2A–D. As shown in FIG. 2A, a video camera 10 captures a particular scene that may include multiple objects or a single object such as a tree 12. The tree 12 is located at a distance D from lenses 14 of the video camera 10, and has an actual height h. Additionally, the scene captured by the video camera 10 has a corresponding dimension denoted as $X_1$. As described previously, the scene and corresponding image may be recorded on a cassette tape 18 in conventional fashion.

As representatively shown in FIGS. 2A and 2B, the captured image of the tree 12 may be reproduced and displayed on the display screen 26 having a corresponding dimension $X_2$. As is to be appreciated, in the normal reproduction mode, the displayed height $h_1$ of the tree 12 is less than the actual height h. This display height $h_1$ is equal to $h(X_2/X_1)$. As an example, consider the situation in which the tree 12 has an actual height h of 3 feet, and $X_1$ and $X_2$ have values of 9 feet and 3 feet, respectively. In such situation, the displayed height $h_1$ has a value of 1 foot (that is, $h_1=(h)X_2/X_1=3\times\frac{1}{3}=1$).

Therefore, in the normal reproduction mode, an object such as the tree 12 having an actual height h may be displayed on display screen 26 with a height substantially less than the actual height. As is to be appreciated, a viewer may not realize the actual size of the tree 12 while viewing the tree in the normal reproduction mode. The present invention overcomes such deficiency by providing the full or actual size mode which may enable the actual size of a desired object (such as the tree 12) to be displayed, as described below.

In the actual size mode, the size of a displayed object such as the tree 12 is adjusted by the ratio of the size of the display screen to the size of the scene captured by the video camera. In the above described example, the ratio $X_1/X_2$ is greater than 1, and thus functions as a magnification factor. Reduction of the size of an object for actual size display is equally applicable to embodiments of the present invention, and will result where the ratio is less than unity.

Continuing with the example, where the captured scene has a dimension $X_1$ of 9 feet and the display screen has a corresponding dimension $X_2$ of 3 feet, the ratio $X_1/X_2$ provides a 3× magnification of the scene and corresponding object in order to provide actual size display. Thus, the tree will be displayed to have a height of $3\times h_1$, or 3 feet, which is the actual size of the tree.

Preferably, the video camera 10 uses the distance D and angle θ to determine the height of the captured scene. The distance D and angle θ are parameters which are available in conventional cameras. For example, automatic focusing cameras may project infrared light towards a subject and use the reflected infrared light to determine the distance to the subject. This distance is then used to alter the focus of the camera, such as through a motor that moves the camera's objective lens. Additionally, the characteristics of the camera's lenses define the angle θ.

According to this embodiment of the present invention, the dimensions of the scene, such as the height $X_1$ of the frame for the particular scene, may then be calculated from the distance to the subject and the angle θ using trigonometric functions. Particularly, the dimension $X_1$ equals $2*D*\tan\theta$. This dimension may be calculated by a processor, such as is shown and described in connection with FIG. 3, below. The video camera 10 may record the image as well as the actual size information pertaining to the image (such as $X_1$) on the tape 18 using conventional techniques. The actual size information, along with the image data, may be recorded on the tape 18 on a frame-by-frame or picture-by-picture basis.

With reference to FIG. 1, the tape 18 may be inserted into the VTR 20 so as to reproduce the recorded image or images and the actual size information. The VTR 20, which is connected to the television unit 22 having display screen 26 with length $X_2$, may be adapted to acquire information (such as the height dimension $X_2$) pertaining to the size of display screen 26. That is, in response to a request signal which may be supplied from the VTR 20 upon initialization thereof or after selection of the actual size mode, or from the remote controller 24 upon selection of the actual size mode by a viewer by depressing key 29, the television unit 22 may automatically send information pertaining to the size of the display screen (such as the height dimension $X_2$ or the like) to the VTR. Alternatively, the television unit 22 may automatically send such display screen size information to the VTR 20 upon initialization thereof or the viewer may manually input such information to the VTR 20 by use of a user input device 25 of the VTR (FIG. 4).

Figure 4:
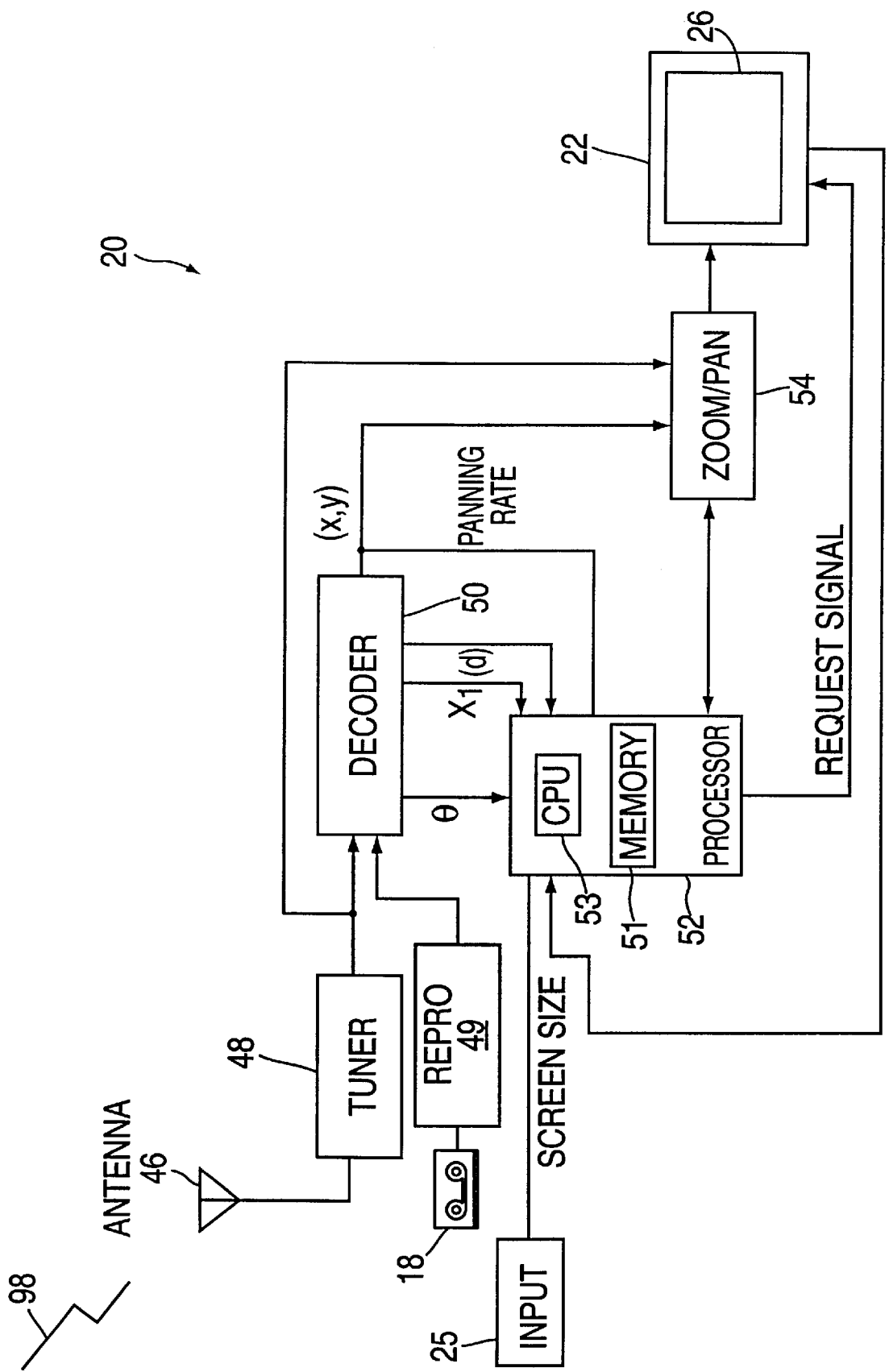
FIG. 4 is a diagram of a VTR incorporating an embodiment of actual size image display features in accordance with the present invention.

The $X_1$ information reproduced from the tape 18 and the screen size or $X_2$ information received from the television unit 22 or the viewer may be supplied to a processor, such as processor 52 of the VTR 20 (FIG. 4). The processor 52 may calculate a magnification/reduction factor $X_1/X_2$ based on the received $X_1$ and $X_2$ information. Such factor may be utilized to produce a video signal which is supplied to the television unit 22 to enable the tree 12 to be displayed in actual size on the display screen 26.

Therefore, upon activation of the actual size mode, a desired object (such as the tree 12) may be displayed on the display screen 26 in actual or full-size. As is to be appreciated, if the full-size of the desired object exceeds the size of the display screen 26, then only a portion thereof will be displayed on the screen 26.

Although in the above-described example the captured object (tree 12) had an actual size which was reduced during normal mode reproduction and which was magnified during the actual size mode, the present invention is not so limited and may also be applied to the opposite situation wherein the actual size of a captured object (such as an ant) may be magnified during normal mode reproduction and which may be reduced during the actual size mode. An example of this latter situation will now be described.

FIG. 2D illustrates a situation in which an image of an ant 13 is captured by the video camera 10. In a manner similar to that previously described with regard to FIG. 2A, the video camera may determine values for angle θ' and distance D' between the ant 13 and lenses 14 of the video camera, may determine length $X_1'$ of the captured scene or image from the distance D' and angle 0°', and may record size information (such as $X_1'$) along with image information (such as of the ant 13) onto the cassette tape 18.

In the above situation, the captured image of the ant 13 may be magnified when reproduced and displayed on the screen 26 having length $X_2$ as representatively shown in FIGS. 2D and 2E. That is, in the normal reproduction mode, the displayed size or height $h_3$ of the ant 13 is greater than its actual size or height $h_4$. On the other hand, in the actual size reproduction mode, the ant 13 may be reduced by a factor $X_1/X_2$. (Here, the factor $X_1/X_2$ is less than one and, as such, functions as a reduction factor.) As a result, the ant 13 (which may have display height $h_3$ on the display screen 26 in the normal mode as shown in FIG. 2D) may have display height $h_4$ on the display screen 26 after activation of the actual size mode as shown in FIG. 2F, wherein $h_4=h_3$ $(X_1/X_2)$.

Figure 3:
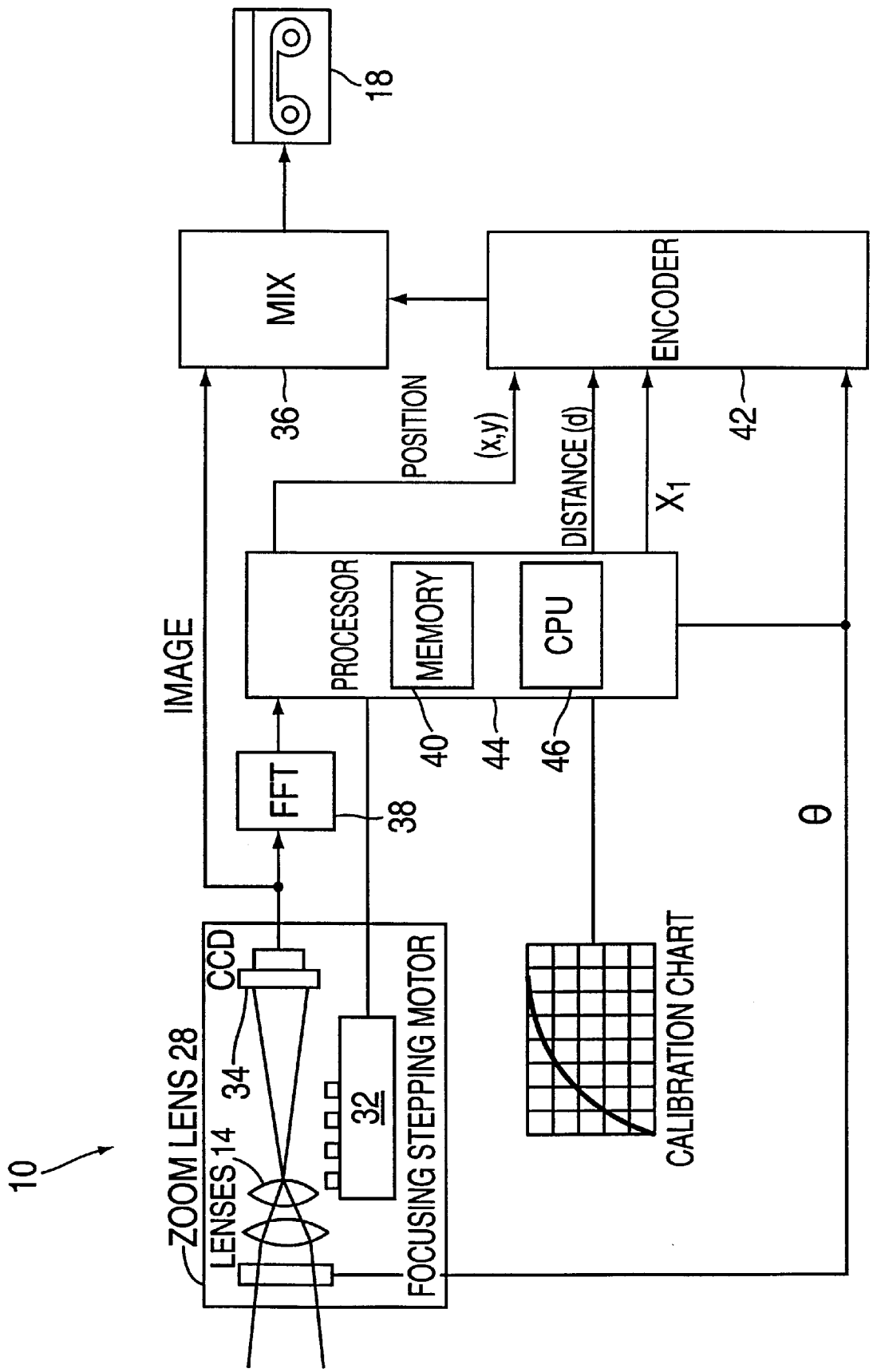
FIG. 3 is a diagram of a video camera incorporating an embodiment of actual size image display features in accordance with the present invention.

An embodiment of a video camera 10 including actual image sizing functionality is illustrated in FIG. 3. The video camera 10 includes a zoom lens unit 28, a mixing unit 36, a fast Fourier transform (FFT) device 38, a processor 44, and an encoder 42 coupled together as shown in FIG. 3. The processor 44 includes a CPU 46 for executing instructions such as those stored in memory 40. Preferably, such execution provides the functionality of determining actual size information described in connection with the present invention. The zoom lens unit 28 includes lenses 14 for focusing on an object of interest, focusing stepping motor 32 for actuating the lenses 14 so as to focus on the object, and a charge coupled display (CCD) unit 34 for taking an image of the object and capturing the image in a CCD array as pixel information and for providing an output signal representative thereof. The stepping motor 32 provides information to the processor 44 and receives control signals therefrom.

The image signal from the CCD 34 is supplied to the mixing unit 36 and to the FFT device 38, whereupon fast Fourier transform processing is performed thereon. An output signal from the FFT device 38 is supplied to the processor 44, which works in conjunction with the FFT device 38 to determine positional information (x, y) in conventional fashion. The processor 44 receives calibration data from an imaging device in the video camera 10, and the value of angle θ from the zoom lens unit 28. Based upon distance detecting information which may be received through the zoom lens assembly 28, the processor 44 calculates the distance (D) between the subject in the image to be captured and the video camera. The processor 44 also receives the value of the angle θ from the zoom lens unit 28. Then using the above described trigonometric function and the values for D and θ, the processor calculates the dimension $X_1$, which pertains to the height of the scene (or the actual height of the frame) corresponding to the captured image.

As shown in FIG. 3, the processor provides the distance D, the position information (x, y), and $X_1$ to the encoder 42, which encodes the information, and passes it to the mixing unit. Alternatively, some of such information may not be supplied to the encoder 42. For example, the distance D and the angle θ information may not be supplied to the encoder 42, particularly where such information is not needed to enable the actual size display mode. The mixing unit 36 associates the desired actual size information with the image signal. The actual size information may be separately associated with the scene containing the relevant image, or the information may be combined with the image signal to provide a combined signal. Preferably, each captured frame has an associated actual size information. Although the actual size information will not typically consume much memory, various compression and encoding techniques may also be used to lower the overall amount of memory required for storing the actual size information. Although the described embodiment illustrates storage of the image and actual size information on cassette tape 18, various other storage media, including a compact disc, a Sony mini disc, or a Sony memory stick may also be used to store images and associated actual size information.

The block diagram of FIG. 4 illustrates an embodiment of a system that uses actual size information to alternatively display images in normal and actual size modes. Particularly, the VTR 20 is coupled to the television unit 22, and provides video to the television unit 22 in conventional fashion. The VTR 20 includes an input device 25, a tuner 48, a reproducing device 49, a decoder 50, a processor 52, and a zoom/pan unit 54 coupled as shown in FIG. 4. The processor 52 includes a CPU 53 for executing instructions, such as those stored in memory 51. Preferably, the processor 52 produces signals for displaying images in the actual size mode based upon the provided actual size information and screen size information, and the execution by its CPU 53 of instructions stored in memory 51. The recorded data on the cassette tape 18 is reproduced by use of the reproducing device 49 in conventional playback fashion, and the reproduced data is supplied to the decoder 50. Alternatively, video data may be received by way of an antenna 46 and tuner 48 and such received video data may be supplied to the decoder 50. In either event, the received data is decoded by decoder 50 into various types of information in correspondence with the encoding operation performed on the previously described recording (or transmission) side. For example, the decoder 50 may produce actual size information $X_1$, distance D, and angle θ, as well as positional information (x, y). Alternatively, as described above, the decoder 50 may merely reproduce the dimension $X_1$ related to the size of the scene for a captured image.

The decoded information, such as the actual size information, is supplied to the processor 52. Additionally, the processor 52 receives screen size information, such as the screen height dimension $X_2$, which is indicative of the size of the screen 26 of the television unit 22. Such screen size information may be automatically supplied from the television unit 22 in response to a request signal which may be supplied from the processor 52 to the television unit 22 or the screen size information may be supplied to the processor 52 from the television unit 22 upon initialization or at the occurrence of another predetermined event. Alternatively, the screen size information may be manually entered by the user by way of input device 25.

Responsive to entry into the actual size mode, the processor 52 preferably calculates an adjustment using the ratio of the size of the frame corresponding to image capture ($X_1$) to the size of the display screen ($X_2$). As described above, this ratio ($X_1/X_2$) provides an adjustment (magnification or reduction) factor that is used to alter the display for the actual size viewing mode. Responsive to the determination of the adjustment for providing actual size viewing, the processor 52 generates a control signal that is provided to the zoom/pan unit 54. The zoom/pan unit 54 then adjusts the signals provided to the television unit 22, so that the image is displayed in actual size. Conventional techniques may be used to adjust the display based upon the zooming control signal. In the embodiment that implements the ratio of the size of the display screen to the size of the frame corresponding to the captured image, a linear magnification or reduction factor is provided. Thus, for example, where $X_1/X_2$ is 3, the corresponding frame is increased in size by three times for display on the television unit. Of course, particularly where the adjustment is a magnification, portions of the normal viewing mode frame might not be visible on the display screen 26.

In addition to analog televisions and display devices, the present invention may be used in conjunction with a digital television or other digital display devices. In such situations, the pixel data corresponding to a frame of video would be manipulated using conventional digital signal processing techniques, but would use the same type of adjustment factor. Additionally, where the image data is captured and/or stored in a digital format, the digital data may be initially manipulated according to the adjustment factor, and then the manipulated data may then be converted to the format required for display, which format may include conventional analog television.

The zoom/pan unit 54 can also use the positional information (x, y), such as in situations where an object is offset from the center of its frame. For example, consider the situation where a user may wish to center the desired object in the screen. In such situation, the positional information (x, y) of the object may be processed by the zoom/pan unit 54 so as position the object in the center of the display screen. Alternatively, the object may be positioned at other locations. Additionally, the position information may be passed to the processor 52, so that such information can be used by the processor 52 for manipulation of the display.

Figure 5:
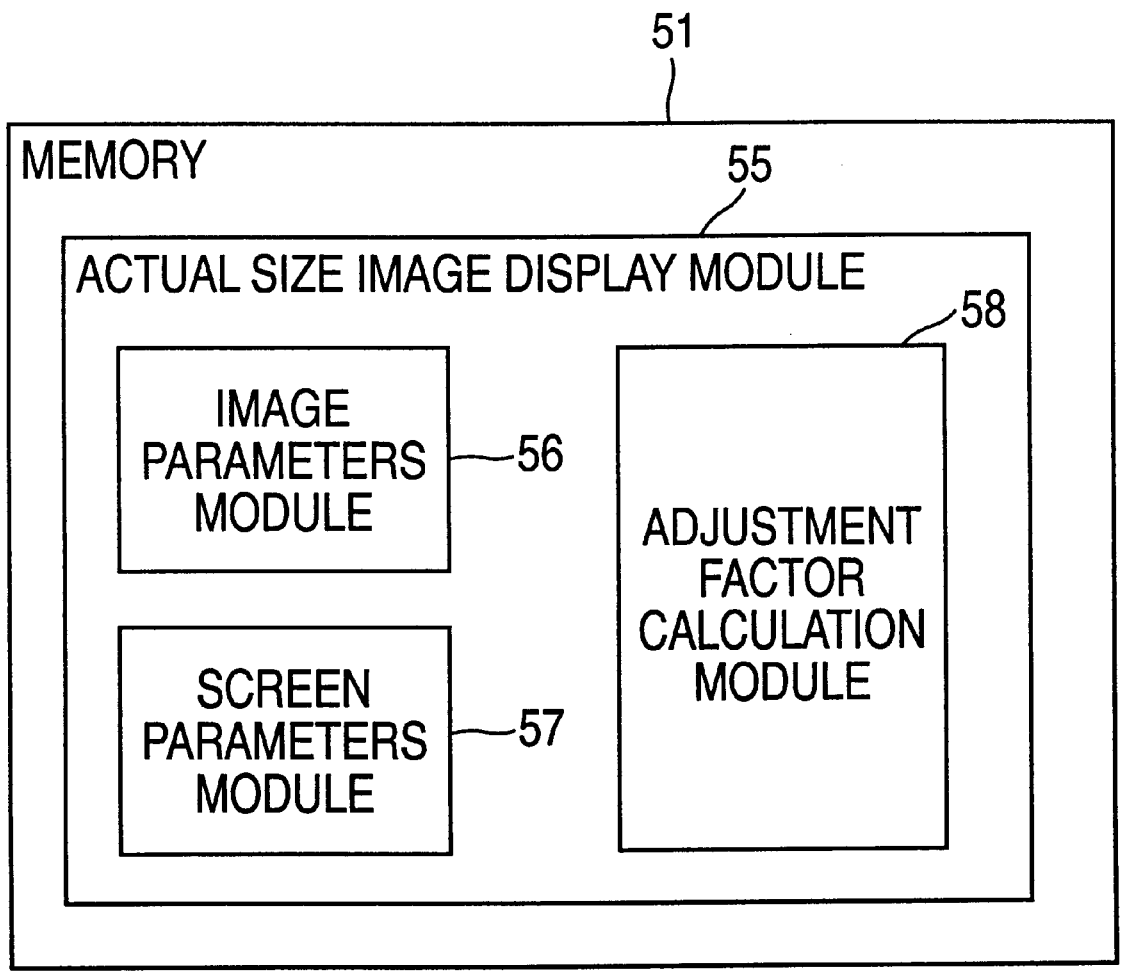
FIG. 5 is a block diagram illustrating a memory configured to include an embodiment of an actual size image display module in accordance with the present invention.

FIG. 5 illustrates an embodiment of the VTR 20 processor 52, configured to provide signals used to display images in actual size. The processor includes a memory 51 that, as described above, stores instructions which can be executed by the CPU 53 (not shown in FIG. 5). Particularly, the memory 51 includes an actual size image display module 55 that includes an image parameters module 56, a screen parameters module 57 and an adjustment factor calculation module 58. The image parameters module 56 receives parameters related to the size of an image that has been previously captured and which is to be displayed by a display device connected to the VTR 20. As described above, various parameters may be provided, but preferably at least one dimension corresponding to the frame or scene in which a subject image is found, such as the height of the frame ($X_1$) in which the captured image resides, is received by the image parameters module 56. The screen parameters module 57 receives similar information relating to the display device to which the VTR 20 is connected. As with the parameters relating to the captured image, various information about the display device can be used, but preferably at least one dimension corresponding to the available area for viewing, such as the height of the display screen ($X_2$) is received by the screen parameters module 57. The adjustment factor calculation module 58 communicates with the image parameters module 56 and the screen parameters module 57, and uses the information provided by such modules to calculate an adjustment factor that can be used by the VTR 20 to ultimately produce control signals that adjust the display to change from a standard display mode to an actual display mode. Particularly, continuing with the preferred example, where the dimensions of the height of the frame corresponding to the captured image and the height of the display screen are respectively the image size information and the display screen information, the adjustment factor calculation module calculates the ratio $X_1/X_2$ to determine the adjustment factor. This adjustment factor may then be passed from the processor 51 to the zoom/pan unit 54, which adjusts the signals provided to the display 22 for an actual size mode. As indicated above, the adjustment factor may magnify the displayed image where the adjustment factor is greater than 1, or reduce the displayed image where the adjustment factor is less than 1.

Although the actual size image display module 55 is preferably provided as software, its functionality could alternatively be provided as hardware or firmware, or any combination of hardware, firmware and software. Additionally, although the memory 51 is preferably a dynamic memory that stores instructions for execution by the CPU 53, the actual size image display module 55 could alternatively be stored on other media such as a floppy disk, Sony mini disc, or Sony memory stick, and so on. The actual size image display module 55 could also be provided in a non-volatile memory (e.g., EEPROM) residing in the VTR 20 (or any other device that drives a display), whereby the actual size image display module 55 could be installed on the VTR 20 after purchase, such as through a connection to the Internet. In these alternatives, the actual size image display module 55 could be loaded into memory 51, whereupon the instructions could be executed by the CPU 53 as described above.

Therefore, the present invention provides a technique for displaying objects in actual size on a display device, such as a TV set, computer monitor, projection screen, and so forth. Although the present actual size reproduction mode or technique was described with reference to a desired "object", it is intended that the term a "desired object" includes a desired person, animal, insect, item and so forth.

Although in the above description, the size information and moving or still images were recorded on a cassette tape in the video camera, the present invention is not so limited. For example, this data may be directly transmitted to a broadcast station, whereat it may be processed and distributed or transmitted as transmitted data 98 for receipt by antenna 46 of a receiver as illustrated in FIG. 4.

The video data and/or image size information pertaining to the scene or object(s) may be recorded on the cassette tape 18 in digital or analog format. Alternatively, such size information may be stored in a memory which may be contained within the video camera 10 or the VTR 20 (such as memory 40 in the video camera or memory 51 of the VTR 20). Further, any image processor or image capture device may provide actual size information in accordance with the present invention.

With regard to the digital format, digital data may be arranged or coded in a predetermined manner for transmission via some form of transmission medium. In this digital arrangement, data areas, known as "user defined areas", may be provided for various uses. The size information may be placed in the user defined area for transmission and subsequent processing.

If the video data is transmitted and processed in analog form, then the size information relating to the scene or objects in interest may be embedded in a vertical blanking interval (VBI) of a cathode-ray tube (CRT) beam undergoing a vertical retracing in the television unit 22.

Further, although in the above description image and size information were recorded or stored for each frame or field, the present invention is not so limited. For example, the amount of data may be reduced by the use of compression techniques such as MPEG or JPEG which may take advantage of redundant information between adjacent frames or fields and transmit only the differences between the frames or fields. In addition to these data compression techniques, other techniques may also be utilized. However, regardless of whether or not the data is compressed, size information may be associated with the recorded video images on a frame or field basis.

Furthermore, although the present actual size mode was described as being activated by use of a remote control device, the present invention is not so limited. For example, the actual size mode may be activated by use of a button, key or the like on a display device, a reproducing device, and so forth without using the remote control device.

Still further, although in the above description of the present invention the VTR 20 produced an image signal representative of an actual size of a desired object in accordance with the screen size and image size information, the present invention is not so limited. That is, this processing may be performed in a device other than a VTR, such as a television unit. Additionally, other devices that drive a display, such as a DVD player, may also incorporate the features of the present invention.

Additionally, although in describing the present actual size mode only a single object (such as the tree 12) in a scene was subjected to the actual size mode function, the present invention is not so limited. For example, the present actual size mode may be utilized wherein a plurality of objects are within a scene. In this situation, objects on the screen may have sizes that are not in correspondence with each other, thereby appearing at various distances from the viewer. That is, the viewer may wish to zoom in or out to an individual object in the image containing several objects appearing on the screen. In this case, the enlarged or reduced object has size information associated with it; and this information pertains only to that object. The other objects on the screen may have their own individual size information associated therewith. Each such image may have addresses that map each object with the size information.

Addressable locations in a memory of the system may contain attribute name and size information for displaying the object in its actual size. For example, the viewer may select a particular object on the screen and activate a predetermined function (such as the actual size mode) to obtain the actual size of the selected object. Then, a controller or processor of the system may access the locations in the memory containing the size information of the selected object and supply the accessed information to the display device. Hence, upon demand of the viewer, the actual size of the selected object is displayed on the screen, while the sizes of other objects in the image remain unmodified on the display screen.

Having described certain embodiments of the invention with reference to the accompanying drawings, it is to be understood that the invention is not limited to those embodiments, and that various changes and modifications may be effected therein by one skilled in the art without departing from the scope or the spirit of the invention as defined in the appended claims.

What is claimed is:

1. A video apparatus comprising:

means for receiving image data representative of at least two objects in an image, each object having an attribute name and size information stored in an addressable memory, such that said each object is separately selectable for display in actual size, said means receiving screen size information indicative of a size of a display screen of a display unit, and image size information indicative of a size of said image; and means for producing an actual size signal representative of an actual size of a desired object of said image in accordance with said screen size and image size information, wherein said actual size signal is adaptable for supply to said display unit so as to enable said desired object of said image or a portion thereof to be displayed thereon in actual size.

2. A video apparatus according to claim 1, further comprising means for generating a request signal for supply to said display unit which requests that said display unit supply said screen size information to said video apparatus.

3. A video apparatus according to claim 1, further comprising means for enabling a user to manually enter said screen size information.

4. A video system comprising:

a video camera for capturing image data representative of at least two objects in an image, each object having an attribute name and size information stored in an addressable memory, such that said each object is separately selectable for display in actual size, for recording image data on a recording medium, for determining image size information indicative of a size of said image, and for recording said image size information on said recording medium;

a display unit having a display screen; and a reproducing device having means for reproducing the recorded image data and image size information from said recording medium, means for receiving screen size information indicative of a size of said display screen, and means for producing an actual size signal representative of an actual size of a desired object of said image in accordance with said screen size and image size information and for supplying said actual size signal to said display unit so as to enable said desired object of said image or a portion thereof to be displayed on said display screen in actual size.

5. A video system according to claim 4, wherein said video camera records image data representative of a plurality of images and records the image size information indicative of the size of each of said images on a picture-by-picture basis on said recording medium.

6. A video system according to claim 4, wherein said reproducing device further includes means for generating a request signal for supply to said display unit which requests that said display unit supply said screen size information to said reproducing device.

7. A video system according to claim 4, wherein said reproducing device further includes means for enabling a user to manually enter said screen size information.

8. A video system comprising:

video camera means for capturing image data representative of at least two objects in said image each object having an attribute name and size information stored in an addressable memory, such that said each object is separately selectable for display in actual size and for determining image size information indicative of a size of said image;

means for broadcasting said image data and said image size information;

a display unit having a display screen; and a reproducing device having means for receiving the broadcasted image data and image size information, means for receiving screen size information indicative of a size of said display screen, and means for producing an actual size signal representative of an actual size of a desired object of said image in accordance with said screen size and image size information and for supplying said actual size signal to said display unit so as to enable said desired object of said image or a portion thereof to be displayed on said display screen in actual size.

9. A video system according to claim 8, wherein said video camera captures image data representative of a plurality of images and determines the image size information indicative of the size of each of said images on a picture-by-picture basis.

10. A video system according to claim 8, wherein said reproducing device further includes means for generating a request signal for supply to said display unit which requests that said display unit supply said screen size information to said reproducing device.

11. A video system according to claim 8, wherein said reproducing device further includes means for enabling a user to manually enter said screen size information.

12. A method for processing video data comprising the steps of:

receiving image data representative of at least two objects in an image each object having an attribute name and size information stored in an addressable memory such that said each object is separately selectable for display in actual size, screen size information indicative of a size of a display screen of a display unit, and image size information indicative of a size of said image; and producing an actual size signal representative of an actual size of a desired object of said image in accordance with said screen size and image size information;

wherein said actual size signal is adaptable for supply to said display unit so as to enable said desired object of said image or a portion thereof to be displayed thereon in actual size.

13. A method according to claim 12, further comprising the step of generating a request signal for supply to said display unit which requests that said display unit supply said screen size information.

14. A method according to claim 12, wherein a user manually enters said screen size information.

15. A method for recording and reproducing video data, said method comprising the steps of:

capturing image data representative of at least two objects in an image, each object having an attribute name and size information stored in an addressable memory, such that said each object is separately selectable for display in actual size;

recording said image data on a recording medium;

determining image size information indicative of a size of an image;

recording said image size information on said recording medium;

reproducing the recorded image data and image size information from said recording medium;

receiving screen size information indicative of a size of a display screen of a display unit; and producing an actual size signal representative of an actual size of a desired object of said image in accordance with said screen size and image size information and supplying said actual size signal to said display unit so as to enable said desired object of said image or a portion thereof to be displayed on said display screen in actual size.

16. A method according to claim 15, wherein image data representative of a plurality of images is recorded and the image size information indicative of the size of each of said images is recorded on a picture-by-picture basis on said recording medium.

17. A method according to claim 15, further comprising the step of generating a request signal for supply to said display unit which requests that said display unit supply said screen size information.

18. A method according to claim 15, wherein a user manually enters said screen size information.

19. A method comprising the steps of:

capturing image data representative of at least two objects in an image, each object having an attribute name and size information stored in an addressable memory, such that said each object is separately selectable for display in actual size;

determining image size information indicative of a size of said image;

broadcasting said image data and said image size information;

receiving the broadcasted image data and image size information;

receiving screen size information indicative of a size of a display screen of a display unit; and producing an actual size signal representative of an actual size of a desired object of said image in accordance with said screen size and image size information and supplying said actual size signal to said display unit so as to enable said desired object of said image or a portion thereof to be displayed on said display screen in actual size.

20. A method according to claim 19, wherein image data representative of a plurality of images is captured and wherein the image size information indicative of the size of each of said images is determined on a picture-by-picture basis.

21. A method according to claim 19, further comprising the step of generating a request signal for supply to said display unit which requests that said display unit supply said screen size information.

22. A system for providing signals used to display images in actual size, the system comprising:

a processing unit, for executing instructions; and a memory, in communication with the processing unit, which provides instructions for receiving image data representative of at least two objects in an image, each object having an attribute name and size information stored in an addressable memory, such that said each object is separately selectable for display in actual size and for receiving image size information that indicates the size of said image, receives screen size information that indicates the size of a display screen, and calculates an adjustment factor using the image size information and the screen size information.

23. An apparatus for providing signals used to display images in actual size, the apparatus comprising:

an image data module, which receives image data representative of at least two objects in an image, each object having an attribute name and size information stored in an addressable memory, such that said each object is separately selectable for display in actual size;

an image parameters module, which receives image size information pertaining to the size of said image;

a screen parameters module, which receives screen size information pertaining to the size of a display screen on which the image can be displayed; and an adjustment factor calculation module, in communication with the image parameters module and the screen parameters module, which calculates an adjustment factor using the image size information and the screen size information, the adjustment factor providing an adjustment that allows the image to be displayed in actual size on the display screen.

24. An apparatus for providing signals used to display images in actual size, the apparatus comprising:

means for receiving image data representative of at least two objects in an image, each object having an attribute name and size information stored in an addressable memory, such that said each object is separately selectable for display in actual size;

means for receiving image size information pertaining to the size of said image;

means for receiving screen size information pertaining to the size of a display screen on which the image can be displayed; and means for calculating an adjustment factor using the image size information and the screen size information, the adjustment factor providing an adjustment that allows the image to be displayed in actual size on the display screen.

25. A method for providing signals used to display images in actual size, the apparatus comprising:

receiving image data representative of at least two objects in an image, each object having an attribute name and size information stored in an addressable memory, such that said each object is separately selectable for display in actual size;

receiving image size information pertaining to the size of said image;

receiving screen size information pertaining to the size of a display screen on which the image can be displayed; and calculating an adjustment factor using the image size information and the screen size information, the adjustment factor providing an adjustment that allows the image to be displayed in actual size on the display screen.

* * * * *